Nov. 30, 1937.  L. H. CHURCH  2,100,796
PIPE COUPLER
Filed April 2, 1936
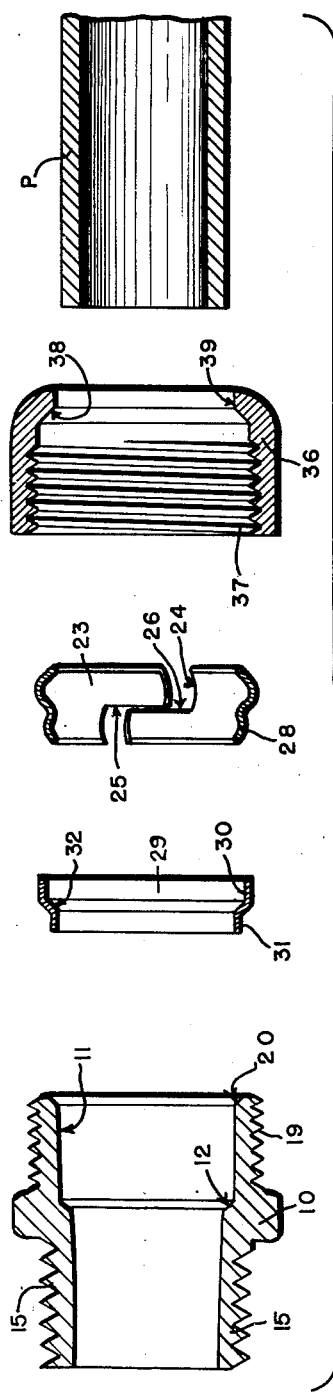
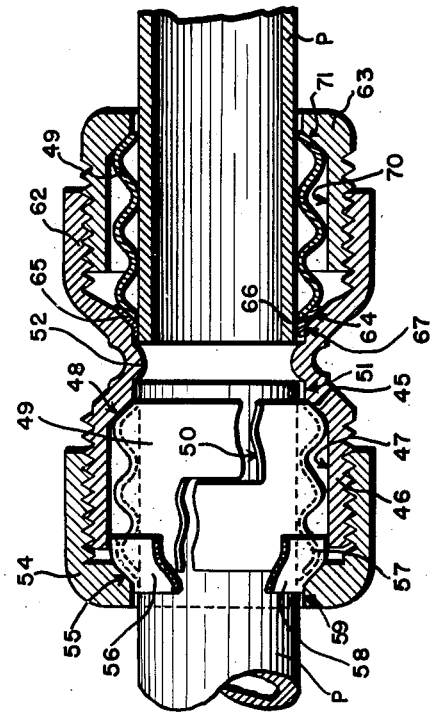
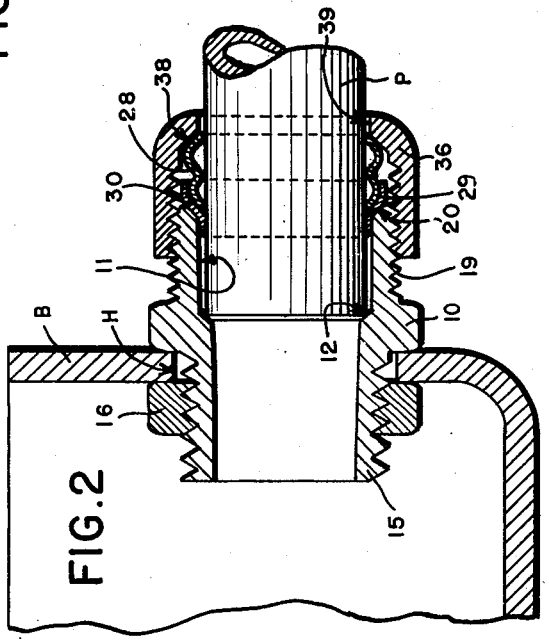
INVENTOR
LEWIS H. CHURCH
BY *Bohleber + Ledbetter*
ATTORNEYS Patented Nov. 30, 1937

2,100,796

UNITED STATES PATENT OFFICE 2,100,796

PIPE COUPLER

Lewis H. Church, Westfield, N. J., assignor to
The Thomas & Betts Co., Elizabeth, N. J., a
corporation of New Jersey Application April 2, 1936, Serial No. 72,253

3 Claims. (Cl. 285—122)

The invention relates to threadless pipe couplers by means of which a pipe, particularly adapted for carrying electrical wires, is secured to other structure without the use of threads upon the end of the pipe. By the invention a moisture-tight seal is obtained so that if the pipe is connected with an outlet box or other electrical structure, moisture will not enter into the box or structure because of the sealed joint obtained by the pipe coupler.

It is an object of the invention to construct a pipe coupler for pipe particularly adapted to receive electrical wiring, which coupler is of the threadless type in that the pipe is not threaded and includes a new and novel moisture-tight construction.

Another object is to construct the contractile clamping member so that the moisture-tight sealing ring is supported thereupon and so that the ring may be readily removed from the pipe coupler and contractile clamping member without destroying the ring.

Other objects of the invention will be more apparent from the following description taken in connection with the accompanying drawing, illustrating the preferred embodiment of the invention, in which:

Figure 1 is an exploded sectional view of the four parts of a pipe coupler utilizing the sealing ring and contractile clamping ring of the invention.

Figure 2 is a longitudinal section of the assembled pipe coupler with the end of a pipe clamped therein and with the pipe coupler secured to an outlet box. The sealing ring is in position sealing the only opening by which moisture could enter into the pipe coupler.

Figure 3 is a longitudinal section of a pipe coupler securing the ends of two pipes together and with a different form of continuous sealing ring for each pipe, and each of which rings differs somewhat from the sealing ring shown in Figures 1 and 2. This figure is intended to show various changes which can be made in the construction without deviating from the invention.

One of the problems connected with electrical installations is the construction of a moisture-tight pipe coupler for coupling together the unthreaded ends of pipes which are intended or adapted to carry electrical wires therein. This problem exists also in coupling the unthreaded end of a pipe to some other structure, such as an outlet box. Moisture may be responsible for short circuits, hence a moisture-tight seal in a coupling is desirable so that it is impossible for moisture to enter into the pipe or into the other electrical structure, such as the outlet box. The pipe coupler to be described herein does provide a tight grip or clamping action upon the pipe so that it will not pull out of the pipe coupler under the normal tension or pull which may be expected to be applied to the pipe, and the coupler is effectively sealed during the process of clamping the pipe within the coupler so that moisture cannot enter into the pipe coupler and hence into any other electrical device, such as an outlet box.

The pipe coupler comprises a coupler member 10 having a bore 11 therethrough to receive the unthreaded end of a pipe P. Preferably, the bore has a shoulder 12 against which the end of the pipe P abuts to serve as a stop for the pipe.

Means is provided for securing the coupler member to some other structure, the means shown particularly in Figures 1 and 2 being the threaded end 15 upon which a lock nut 16 is received. The threaded end 15 of the coupler member is inserted in the hole H in the outlet box or other electrical device B, whereupon the lock nut 16 is threaded thereupon to clamp the coupler member 10 to the outlet box. Any other structure desired, such as another pipe coupler as shown in Fig. 3, may be substituted for the threaded end 15. That part of the coupler member surrounding the bore 11 carries threads 19, the purpose of which will be described hereinafter. The coupler member 10, in the construction particularly shown in Figures 1 and 2, carries an inclined or conical surface 20 at the outer end of the bore 11.

A contractile clamping member or sleeve 23 is provided for gripping the unthreaded end of the pipe P, the contractile clamping member particularly shown herein being a corrugated clamping member having preferably a longitudinal slot 24 extending therethrough. The slot particularly shown is staggered so that opposing edges 25 and 26 are provided which engage with each other when the clamping action takes place and form a moisture-tight contractile member in that a continuous open slot is not provided which will permit moisture to pass freely therethrough from one end of the contractile clamping member to the other. It is to be understood that any form of contractile clamping member may be provided, and the contractile clamping member may be provided with any form of longitudinal slot to render the clamping member contractile.

In the form of contractile clamping member or sleeve 23 shown in Figures 1 and 2, one of the corrugations 28 has a smaller exterior diameter than that of the other. This is provided so that the continuous sealing ring or metallic gasket 29 may fit thereover, or so that the end of the contractile clamping member may fit into the larger cylindrical part 30 of the sealing ring and enable this part of the ring to have a diameter approximating the diameter of the larger corrugation of the contractile clamping member.

The continuous sealing ring 29 has a smaller cylindrical part 31 which is slightly larger than the bore 11 in the coupler member 10. These two cylindrical parts are connected by an angular or inclined part 32 for engaging or abutting against the incline of the smaller corrugation 28 of the contractile clamping member 23. The continuous sealing ring is formed of a soft material, such as brass or copper, and is relatively thin, being in the neighborhood of eight thousandths of an inch. This continuous sealing ring is therefore deformable so that it can be forced into the space between the pipe P and the bore 11 of the coupler member 10, as will appear more fully hereinafter.

An operating means or nut 36 carries threads 37 for engaging the threads 19 upon the coupler member 10. The end of this nut carries an inclined or conical surface 38 for engaging or abutting against the inclined end of the larger corrugation of the contractile clamping member 23. The operating nut has also a bore 39 so that the pipe P may be inserted therethrough.

In assembling the pipe coupler described above, the continuous sealing ring 29 is slipped upon the smaller corrugation 28 of the contractile clamping member or sleeve 23, whereupon these two parts are inserted within the operating nut 36 which is then threaded upon the threads 19 of the coupler member 10. The unthreaded end of the pipe P is then inserted through the bore 39 of the operating nut 36, through the contractile clamping member 23 and ring 29 and into the bore 11 of the coupler member 10 until the end of the pipe abuts against the stop 12. The operating nut 36 is then tightened which subjects the contractile clamping member to a combined axial and radial contraction by virtue of the inclined surface 32 on the sealing ring 29 and the inclined surface 38 on the operating nut 36. Under this clamping action, the smaller cylindrical part 31 of the sealing ring deforms and is forced between the pipe P and the bore 11 and thereby effectively seals this joint so that moisture cannot pass therethrough into the outlet box B or into the pipe P.

It is clear that the contractile clamping member 23 with its sealing ring 29 may be reversed so that the sealing ring seals the space between the pipe P and the bore 39 of the operating nut 36. Such a location for the sealing ring is illustrated in Figure 3. Such a location for the sealing ring does not provide as effective a moisture-proof seal as in the position illustrated in Figure 2 since moisture could conceivably pass between the threads 19 on the coupler member 10 and the threads 37 on the operating nut. It is for this reason that the preferred location for the sealing ring is that illustrated in Figure 2.

Figure 3 illustrates a pipe coupler adapted to couple together the unthreaded ends of two pipes and also illustrates various changes which may be made in the construction and having the same function and operating substantially in the same manner as the construction illustrated in Figures 1 and 2. The threadless pipe coupler of Figure 3 includes a coupler member 45 having a threaded end 46 in which there is a bore 47. The end of the bore 47 has an inclined surface or shoulder 48 against which the end of a contractile clamping member 49 abuts. The clamping member 49 is illustrated as being a corrugated sleeve and has a longitudinal slot 50 to render the same contractile. The slot 50 is staggered to avoid a continuous slot or passage from one end of the sleeve to the other end.

A threaded operating member or nut 54 is received upon the threaded end 46 of the coupler member 45 and has an inclined surface 55 against which a continuous sealing ring 56 engages. The continuous sealing ring has a large cylindrical part 57 which engages over the contractile clamping member or sleeve 49 in a manner similar to the construction shown in Figures 1 and 2, excepting that the corrugation is not reduced in diameter to receive the sealing ring. This sealing ring 56 has a smaller cylindrical part 58 which is forced into the space between the pipe P and the bore 59 on the operating nut 54 and also has an inclined part which abuts against the end of the contractile sleeve 49. It is clear that this continuous sealing ring 56 may be positioned upon the other end of the contractile clamping member 49, in which case the smaller cylindrical part 58 thereof will be forced into the space between the pipe and the bore 51 on the coupler member 45. As previously discussed, this latter position is the preferred location for the continuous sealing ring, although it is positioned at the other end in Figure 3 for the purpose of illustration.

The securing of the unthreaded end of the pipe P in the construction just described is similar to that described in connection with the construction shown in Figures 1 and 2 and need not be further discussed. It should be noted, however, that in this construction the contractile clamping member fits within the bore 47 of the coupler member 45 and does not engage the outer end thereof as in the construction illustrated in Figures 1 and 2. The coupler member 45 preferably is provided with a shoulder 52 against which the end of the pipe abuts and provides a stop so that when the operator pushes the pipe into the coupler member, it will be pushed thereinto far enough to be gripped by the contractile sleeve 49 and also will not be pushed too far thereinto.

The other end of the contractile clamping member is adapted to be secured to the unthreaded end of another pipe P. In its broader aspect, however, this end may be described as means for securing the coupler member to some other structure. The end 46 may also be so described, in the broader aspect of the invention, in connection with the right-hand end of the pipe coupler. This may be expressed in another way, namely either one of the pipe securing ends may be substituted for the threaded end 15 illustrated in the coupler member 10 of Figures 1 and 2.

The other end 62 of the coupler member 45 is also threaded to receive an operating member or nut 63. The end 62 of the coupler member 45 has an inclined surface or part 64 against which the inclined end of the continuous sealing ring 65 abuts. The sealing ring 65 differs from the sealing rings 29 and 56 in having only a smaller cylindrical part 66 which is forced in between the pipe P and the bore 67 in the coupler member 45.

The operating nut 63 carries threads to cooperate with the threaded end 62 of the coupler member and also has a bore 70 which receives the contractile clamping member or sleeve 49. The operating nut 63 also has an inclined surface 71 against which the end of the contractile clamping member 49 abuts.

It will be observed that the pipe coupler illustrated by the right-hand end of the double ended pipe coupler shown in Figure 3 has the contractile clamping member 49 received within a bore in the operating nut 63 and in this respect differs from the construction shown on the left-hand end of the pipe coupler of this figure and from the construction of pipe coupler illustrated in Figures 1 and 2. The operation and function of the form of pipe coupler described is, however, the same in the various forms illustrated. In each of the forms illustrated, however, it will be noted that the contractile clamping sleeve and the continuous sealing ring together form clamping and sealing means, one end of which means engages a shoulder, preferably an inclined shoulder carried by the coupler member, and the other end of this means is engaged by a shoulder, which is also preferably an inclined shoulder, carried by the operating nut. In each of the forms illustrated the smaller cylindrical part of the continuous sealing ring is forced between the pipe and a bore carried either by the coupler member or by the operating nut to effectively seal the joint or passage therebetween. In this connection, it should be borne in mind that it is not essential that the inclined surface upon the continuous sealing ring engage or abut the inclined surface in the coupler member or operating nut. It is within the province of the invention that this continuous ring be rigid enough so that it may be held spaced from the surface by virtue of the contact created by forcing the smaller cylindrical portion 31, 58 or 66 into the space between the pipe and the bore into which the sealing ring is forced.

Various modifications will occur to those skilled in the art in the configuration, composition and disposition of the component elements going to make up the invention as a whole, as well as in the selective combination or application of the respective elements, and no limitation is intended by the phraseology of the foregoing description or illustration in the accompanying drawing.

What is claimed is:

1. A pipe coupler comprising a threaded coupler member having a bore therein to receive a pipe; clamping and sealing means having one end thereof engaging the coupler member including a contractile sleeve to embrace the pipe, and a continuous ring of thin material engaging one end of the contractile sleeve; an operating member engaging the other end of the clamping and sealing means and having a pipe receiving bore; and threads upon the operating member engaging the threads on the coupler member to move the former axially with respect to the coupler member to contract the sleeve; the continuous ring having a part engaging the end of the flexible sleeve for axial movement therewith upon tightening of the operating member and also having a cylindrical part at least the edge of which is forced into the space between the pipe and the pipe receiving bore in one of the members.

2. A pipe coupler comprising a threaded coupler member having a bore therein to receive a pipe; clamping and sealing means having one end thereof engaging the coupler member including a contractile sleeve to embrace the pipe, and a continuous ring of thin material engaging one end of the contractile sleeve; an operating member engaging the other end of the clamping and sealing means and having a pipe receiving bore; and threads upon the operating member engaging the threads on the coupler member to move the former axially with respect to the coupler member to contract the sleeve; the continuous ring having three parts, a part engaging the flexible sleeve for axial movement therewith upon tightening of the operating member, a cylindrical part at least the edge of which is forced into the space between the pipe and the pipe receiving bore in one of the members, and a larger cylindrical part which fits over the contractile sleeve to hold the ring in position prior to use.

3. A pipe coupler comprising a threaded coupler member having a bore therein to receive a pipe; clamping and sealing means having one end thereof engaging the coupler member including a corrugated contractile sleeve to embrace the pipe, and a continuous ring of thin material engaging one end of the contractile sleeve; an operating member engaging the other end of the clamping and sealing means; and threads upon the operating member engaging the threads on the coupler member to move the former axially with respect to the coupler member to contract the sleeve; one of the corrugations at the end of the contractile sleeve being smaller than the other; the continuous ring having three parts, a part engaging the flexible sleeve for axial movement therewith upon tightening of the operating member, a cylindrical part at least the edge of which is forced into the space between the pipe and the pipe receiving bore in one of the members, and a larger cylindrical part which fits over the smaller corrugation on the contractile sleeve to hold the ring in position prior to use.

LEWIS H. CHURCH.